Oct. 18, 1938.  D. FISHER ET AL  2,133,384
SYSTEM AND METHOD FOR IDENTIFICATION OF CONDUCTORS IN CABLES
Filed Sept. 3, 1937  2 Sheets-Sheet 2

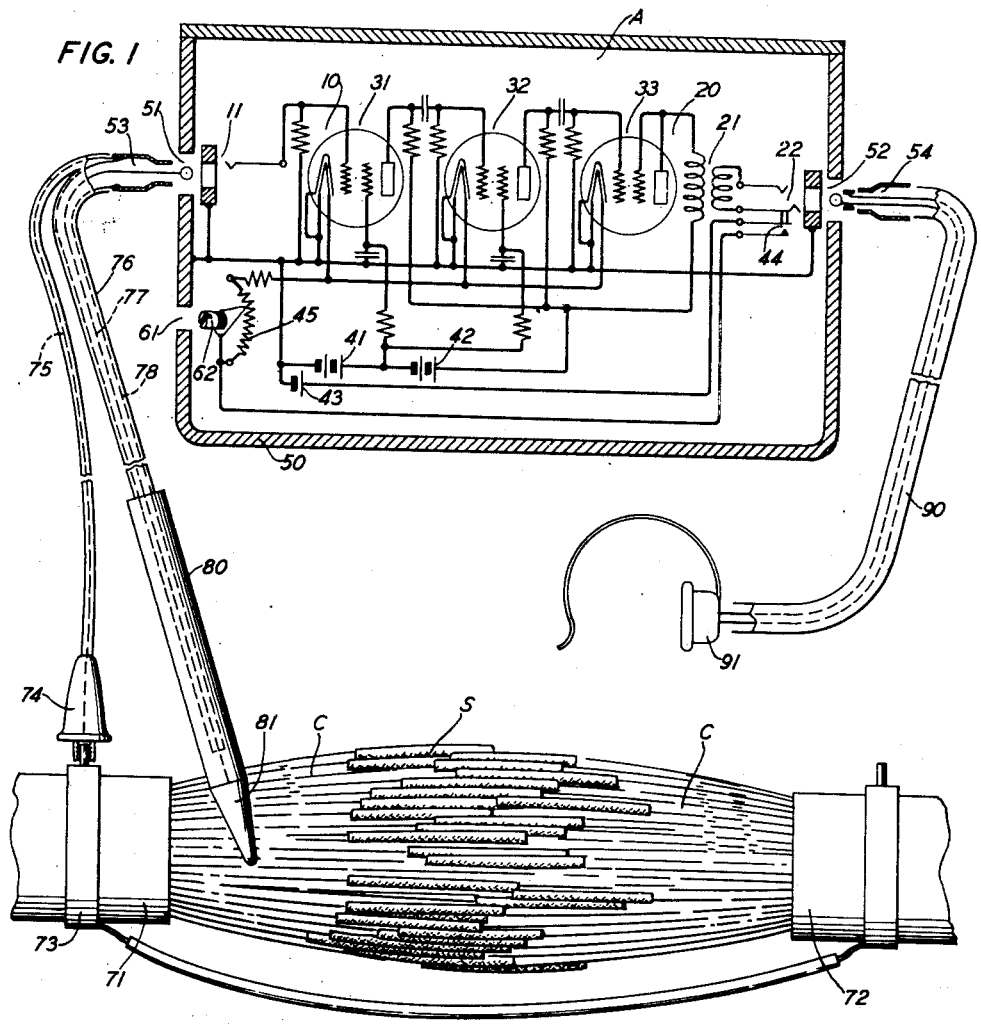

INVENTORS: D. FISHER
G. B. PARKER
BY
William R. Ballard
ATTORNEY

Patented Oct. 18, 1938

2,133,384

UNITED STATES PATENT OFFICE 2,133,384

SYSTEM AND METHOD FOR IDENTIFICATION OF CONDUCTORS IN CABLES

Donald Fisher, Elizabeth, and George Blaine Parker, East Orange, N. J., assignors to American Telephone and Telegraph Company, a corporation of New York Application September 3, 1937, Serial No. 162,376

6 Claims. (Cl. 175—183)

This invention relates to conductor testing systems and particularly to systems of this type which are used for identification of individual conducting strands in cables containing a plurality of insulated conducting strands, such as telephone communication cables or other signaling cables of this general nature, and to methods of identifying conducting strands in such cables.

It is an object of the invention to provide a testing set of this type, whereby the more laborious prior method of penetrating the insulation of conductors to establish contact between them and the set may be obviated, so that identificaiton of the conductors may proceed more rapidly.

It is another object of the invention to provide a testing set which may be used on cables having other conductors under service during the operation of identifying a given conducting strand, without interfering with the service on such other conductors.

Another object of the invention is to provide a testing set of this type which is convenient for transportation and for use in confined spaces, such as manholes, and which does not require that connections be made to external sources of power supply.

In accordance with the invention, a high amplification amplifying set has its output side connected to a receiver, such as a lineman's headset, and has its input side connected to a shielded flexible conductor terminating in a probe. The probe has an insulating handle, the free end of which carries an exposed, metallic, cone-shaped tip connected to the flexible conductor. The tip has a blunt point, so that it may readily be probed among a bundle of conductors of a cable, such as a telephone cable, without penetrating or injuring the insulation on the conductors. The probe is adapted to act with a conductor of a cable as a small condenser for picking up impulse currents in the conductor and imposing them upon the amplifying set for audible observation by means of the headset.

In accordance with the invention, a source of oscillating current is connected to the conductor to be identified at a remote point of the cable where the conductor already has been identified; at the point of testing the probe is then inserted among the conductors of the cable at different angles until a tone is observed due to the oscillating current in the conductor, and the process is continued by segregating the conductors, which at this time are in close engagement with the exposed point of the probe, and again applying the probe to determine the individual conductor from which the tone was received. It should be understood that the invention may be used for identification of individual conductors or of conducting strands, such as pairs and quads.

The most recent prior method of identifying conductors under such circumstances requires that metallic contact be established between the headset and the conductor to be identified, in order that the tone current may be received in the headset. Thus a large number of conductors must be tested by means of a sharply pointed probe which pierces the insulation to make contact with the conductor. This process obviously requires considerable time in the case of large telephone cables, and it is necessary to use special care to avoid bridging two conductors with the probe. On account of the continued probing and contacting with the conductors of the cable, this prior method is unsatisfactory for use on cables which are in service.

The invention will now be described more in detail as applied to a specific embodiment, and reference will be made to the accompanying drawings, in which Fig. 1 is a diagrammatical view showing the amplifier set and its connection to a cable which is under observation;

Fig. 2 is a detailed view of the probe used with the set shown in Fig. 1;

Fig. 3 is an enlarged view showing the probe projected into a bundle of conductors;

Figure 4:
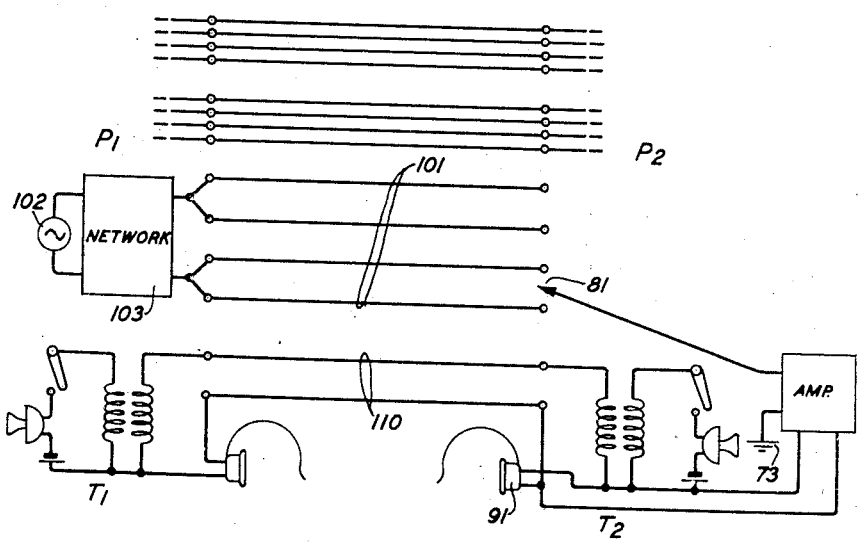
Fig. 4 is a schematic diagram showing the connections used in identifying a cable quad.

Referring now more particularly to Fig. 1, the amplifier set comprises a three-stage resistance coupled amplifier A having an input circuit 10 connected to a jack 11, and an output circuit 20 connected through a transformer 21 to a jack 22. The plate circuits of the amplifying tubes 31, 32 and 33 are supplied with current from batteries 41 and 42, which are 22½ volt dry-cell batteries. The filaments are supplied with current from battery 43, which is a 4½ volt dry-cell battery. The filament current from the battery 43 is supplied over contacts 44 of jack 22 and adjustable resistance 45.

The amplifier A is placed within a metal box 50 which serves as a shield for the amplifier against external electrical disturbances. The box has openings 51 and 52 for insertion of plugs 53 and 54 into the jacks 11 and 22, respectively. The box 50 has another hole 61 through which a screwdriver may be inserted into a slotted shaft 62 for adjustment of the filament resistance 45.

Fig. 1 indicates diagrammatically a splice S between two lead-sheathed cable sections 71 and 72. The conductors C are usually paper-and-air insulated and are grouped in pairs or quads as they leave the lead sheaths of the cable sections. In the center portion of the splice corresponding conductors from the two cables are joined and each joint is covered by an insulating sleeve of a greater diameter than the insulated conductor. A ground connection 73 is established on one of the lead sheaths and connection is made from this ground by a suitably insulated clip 74 through a flexible insulated conductor 75 connected to the sleeve of plug 53.

The tip of plug 53 is connected through a flexible cord 76 to the tip 81 of the probe 80. As shown more in detail in Fig. 2, the cord 76 has a central insulated conductor 77 surrounded by a flexible shielding 78 of closely braided metal wires, which in turn is surrounded by a layer of insulation 79. The shielding 78 is connected to the grounded sleeve of jack 53, as shown in Fig. 1.

Again referring to Fig. 2, the probe 80 comprises a tubular handle 82 threaded at one end to receive a threaded portion of the metallic tip 81. The cord 76 is inserted through the hollow handle and the conductor 77 is connected to the tip 81 by any suitable means, such as a screw 83. This end of the cord 76 is prepared in such a manner that the shielding 78 comes within approximately ¼-inch of the bare conductor 77 or metal parts of the tip 81. The exposed part of the tip 81 is conical with the apex rounded to form a blunt point; the exposed surface is smoothed off and may be coated to prevent oxidation, if desired. It has been determined that a blunt point having a radius of .04-inch will not injure the usual paper insulation on telephone conductors.

As shown in Fig. 1, the plug 54 is connected by means of a double cord 90 to a lineman's headset 91 of any convenient construction.

During operations the box 50 is kept closed. Plug 53 is inserted into jack 11, thereby connecting ground from the ground connection 73 to the sleeve of jack 11, the amplifier A and the box 50, and thereby also connecting the probe point 81 through the tip of jack 11 to the input circuit of amplifier tube 31. The plug 54 is inserted into jack 22, thereby connecting the headset 91 to the output circuit of the amplifier tube 33. By the insertion of plug 54 into jack 22 the contacts 44 are closed, thereby completing the filament circuit for the tubes 31, 32 and 33. After proper adjustment of the filament resistance 45, the set is ready for use.

Various circuit arrangements may be used for the operation of the set in identifying conducting strands, depending somewhat on the type of cable which is under observation.

Thus the circuit arrangement shown in Fig. 4 is particularly adapted for identifying quads in a toll cable, which usually are arranged in two main groups, one for each direction of transmission. The invention has the advantage that the tone source may be applied to quads in either direction of transmission with respect to the point of application.

As shown in Fig. 4, the quad 101 of a cable running between points P1 and P2 has applied to it a source of oscillatory current 102 at the point P1; one terminal of the source is multipled to the two conductors of one pair and the other terminal is multipled to the other pair. The source 102 is adapted to generate an oscillating current either of a single audible frequency about 1,000 cycles, or of a suitable combination of audible frequencies producing a tone of a given quality. A network 103 may be connected in series with the source 102 to effect a desired wave shape and to control the level or volume of the tone current.

At point P2 the amplifier A is connected between the headset 91 and the probe point 81. For convenience a pair of conductors 110 in the cable, which have already been identified, may be used to interconnect attendants' telephone sets T1 and T2 of any convenient design at the points P1 and P2, respectively. If desired, the headset 91 may be connected to be common to the amplifier A and the pair 110, as shown. In this arrangement the tone received by receiver 91 may also be heard over the pair 110 in the receiver of the set T1.

With the system set up as just described, a tone will be present on the four conductors of the quad 101, and should be of a reduced level or loudness to prevent interference with other circuits within the cable, which may be under service.

At the point P2 where the other end of the quad 101 is to be identified the operator grasps the probe 80 by the insulating handle, being careful not to touch the bared point 81 and as a preliminary test moves the point 81 along the outer surface of the bundle of conductors C, keeping the cone surface of the point 81 in close engagement with the insulation of the conductors, substantially as shown in Fig. 1. If the quad 101 having the tone applied thereto be located in the outer layer of the cable, the point 81 will pick up the tone as soon as the surface comes in close proximity to the quad, a condenser being formed by the surface of the tip 81 and one or more of the conductors in the quad 101, separated by the paper-and-air insulation surrounding the conductors.

It is evident that the tone may be picked up from any one of a few quads that may be simultaneously engaging or in proximity with the surface of the tip 81; the number of quads which thus can be heard is, however, limited by the shield 78 which is brought as close to the tip as reasonable safety against short circuit will permit. The operator thereafter separates from the bundle the few quads from which the tone may have been picked up and thereafter brings the tip into engagement with the insulation of the individual quads to finally identify the quad 101 having the tone applied thereto.

The comparatively weak oscillating current picked up by the probe 80 passes, substantially without interference from external sources, through the shielded conductor 77 into the shielded amplifier A over the tip of the jack 11 and is impressed upon the grid circuit of the tube 31, whereupon it is amplified and received in the headset 91 for observation by the operator.

It has been observed that a tone of a quality familiar to the lineman and not exceeding the usual speech level, may be picked up, sufficiently amplified and readily distinguished by the lineman over distances of forty miles.

It is readily apparent that the probe 80 may be moved about the surface of the conductor bundle at a much greater speed than would be possible with the prior art needle-point probe, with which it is necessary to stop at each conducting strand and puncture the insulation and secure contact with the conductor. It is also evident that with the prior method the insulation of certain conducting strands may have been punctured perhaps a hundred times before all the conductors of a large cable had been identified; this possibility is entirely avoided by the method of the invention.

If no tone is observed on the conductors in the outer layer of the cable, the quad 101 must be located in the inner layers of the cable and the lineman now operates the probe to force the point 81 in a substantially radial direction into the bundle of conductors. The conical shape of the point 81 readily permits the probe to pass between the loosely packed conducting strands at the splice and the rounding of its tip prevents the probe from puncturing or injuring the insulation of the strands during the probing operation. As shown in Fig. 3, the probe point will be in simultaneous engagement with a number of quads C and whenever the tone is observed, it will be necessary to segregate the several strands about the location of the tip and the process may be continued in any convenient manner as by in turn separating the segregated strands into groups and determining the group in which the tone is present, and thereafter identifying the individual strands having the tone applied thereto.

Best results will usually be obtained from the condenser effect secured by holding the probe against the regular insulation of the strand rather than against, for example, the insulating sleeves over the joints.

During the tests conversation may be maintained between the sets T1 and T2 to establish cooperation between the two operators and it has been found to be an advantage for the operator at the set T1 to be able to hear the picked-up tone from the amplifier A and thus be able to follow the progress of identification at the point P2.

The arrangement shown in Fig. 4 is of particular advantage in quadded cables inasmuch as the tone will be present on all four conductors of the quad and since the probe is able to engage only one of the conductors on the quad at a time. The balanced application of the tone to all four conductors will cause a minimum of disturbance to other circuits within the cable.

Figure 5:
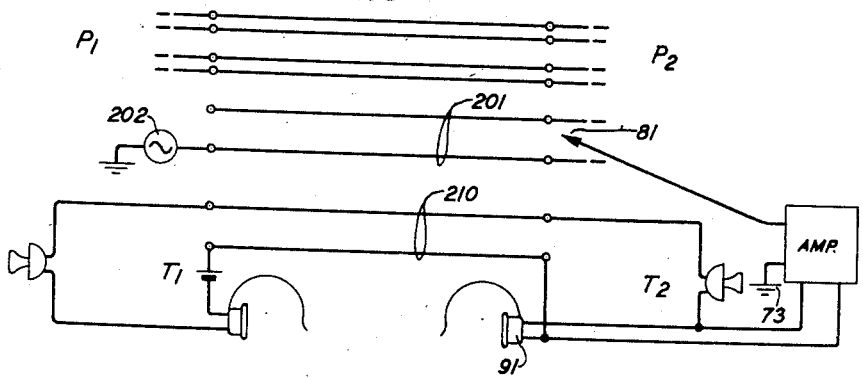
Fig. 5 is a schematic diagram showing an alternative circuit set-up for identification of a cable pair.

A simplified arrangement for identifying conductors is shown diagrammatically in Fig. 5, in which a cable is assumed to be made up of conductor units formed by twisted pairs, as is usual within city areas surrounding an exchange.

In this arrangement the tone source 202 has one terminal grounded and the other terminal connected to one of the conductors of the pair at point P1. The probe point 81 is operated in the same manner as described before to impress the picked-up oscillating current upon the amplifying set A for observation by the receiver 91. Also in this arrangement a talking pair 210 may be used for communication between the operators' sets T1 and T2 at the points P1 and P2, respectively.

It is evident that the exploring set may be used also in identifying conducting strands at the end of a cable section which has not yet been spliced to the next cable section. The set may also be designed for use with groups of conductors other than those of signaling cables and having insulation other than paper-and-air insulation.

What is claimed is:

1. A high amplification test set for making a weak oscillating current audible, a probing conductor connected to the input side of said test set for locating within a comparatively large space an insulated conducting strand having a low potential source of oscillating current connected thereto at a remote point, said probing conductor having a metallic screen against electrostatic interference surrounding its entire length except for a small portion forming a localized area exposed to electrostatic fields and bared for engagement with the insulation of said strand for detection of a tone from said oscillating current.

2. A test set for locating within a comparatively large space an insulated low tension conducting strand having a low potential tone current applied thereto at a remote point, said test set comprising an amplifying system, a tone detecting device connected to the output of said system, a probing conductor having one end connected to the input of said amplifying system, a metallic screen against electrical interference surrounding said conductor substantially over its entire length and insulated therefrom, the other end of said probing conductor extending a short distance beyond said screen and being formed into a surface of small area for engagement with the insulation of said conducting strand to form with said strand a capacitance for transmission of the tone to said amplifying system.

3. A probe for testing insulated conducting strands of a low tension cable comprising an elongated hollow handle and a blunt metal tip attached to one end of said handle and presenting a substantially conical surface for probing among said strands without penetrating their insulation and for engagement with the insulation of the said conducting strands to be tested, a connecting cord having one end passing through said handle to said tip and comprising an insulated conductor connected to said tip and a metallic flexible screen against electrical interference surrounding substantially the entire length of said insulated conductor to a point within said handle as close to said tip as reasonable safety against short circuit will permit, a ground connection to said screen, a high amplification·amplifying set having an input and an output side, a receiving device connected to the said output side, the other end of said insulated conductor being connected to said input side.

4. A test set for detecting a weak pulsating field set up by one of a plurality of insulated conducting strands of a low voltage cable which comprises a probe having a blunt cone-shaped metallic tip capable of penetrating between the said conducting strands without penetrating the surface of their insulation, said metallic tip being capable of acting as one plate of a condenser when located near said one conducting strand acting as the other plate of the condenser, an amplifying system, an observing device connected to the output of said amplifying system, and a conducting cord connecting said tip to the input side of said amplifying system, said probe having a hollow non-metallic handle portion for passing said cord to said tip and for establishing a separation between said cord and said strands during probing operations.

5. A method of identifying at a given locality one conducting strand among a plurality of individually insulated conducting strands in a communication cable which comprises applying a non-interfering oscillating current to a remote point of said one conducting strand, probing a blunt test conductor of relatively small exposed area into the spaces between said insulated conducting strands without penetrating their insulation, thereby forming capacitances of said test conductor and a few of said insulated conducting strands engaging said area with the exterior surface of their insulation, impressing the capacitance current upon a high amplification tone detecting set and observing whether or not the said oscillating current is present on one of the insulated conducting strands included in said capacitances.

6. A method in accordance with claim 5 comprising the further subsequent steps of segregating said few conducting strands from the remaining strands, engaging the said blunt test conductor with the insulation of the individual ones of said segregated strands and observing the absence or presence of the said oscillating current thereon.

DONALD FISHER.
GEORGE B. PARKER.